United States Patent
Miller, Jr. et al.

[15] 3,704,405
[45] Nov. 28, 1972

[54] POSITIONING DEVICE

[72] Inventors: Earl D. Miller, Jr., Tallmadge; Ronald J. Kindy, N. Canton, both of Ohio

[73] Assignee: Eagle-Picher Industries, Inc., Cincinnati, Ohio

[22] Filed: Jan. 15, 1971

[21] Appl. No.: 106,852

[52] U.S. Cl. ................................ 318/467, 318/663
[51] Int. Cl. ............................................. G05b 1/06
[58] Field of Search .............. 318/467, 663, 665, 666

[56] References Cited

UNITED STATES PATENTS

| | | | |
|---|---|---|---|
| 3,020,458 | 2/1962 | Morgan | 318/665 X |
| 2,989,256 | 6/1961 | Lee | 318/663 X |
| 3,470,431 | 9/1969 | Jones | 318/663 |
| 3,467,900 | 9/1969 | Benton | 318/663 X |

*Primary Examiner*—Benjamin Dobeck
*Attorney*—Teare, Teare & Sammon

[57] ABSTRACT

A system for controlling a drive mechanism to selectively move a work member from an existing position to a desired position. The system includes a probe-like sensing member adapted to engage and be moved by the work member. The sensing member is operably connected to a signalling mechanism adapted to produce an output signal related to the position of the work member. A position selecting assembly including at least one selector unit adapted to be selectively preset corresponding to a desired position and to produce an output signal related thereto. A position indicating assembly is operably connected to the signalling mechanism and the position selecting assembly being adapted to receive the respective output signals therefrom and produce a different signal related to the variation between the existing position to the desired position of the work member. A signal analyzing assembly is operably connected to the position indicating assembly for analyzing the output signal thereof and for producing an output signal to activate the drive mechanism in response thereto to move the work member from the existing position to the desired position.

20 Claims, 10 Drawing Figures

INVENTOR.
EARL D. MILLER
BY RONALD J. KINDY

*Teare, Teare & Sammon*

ATTORNEYS

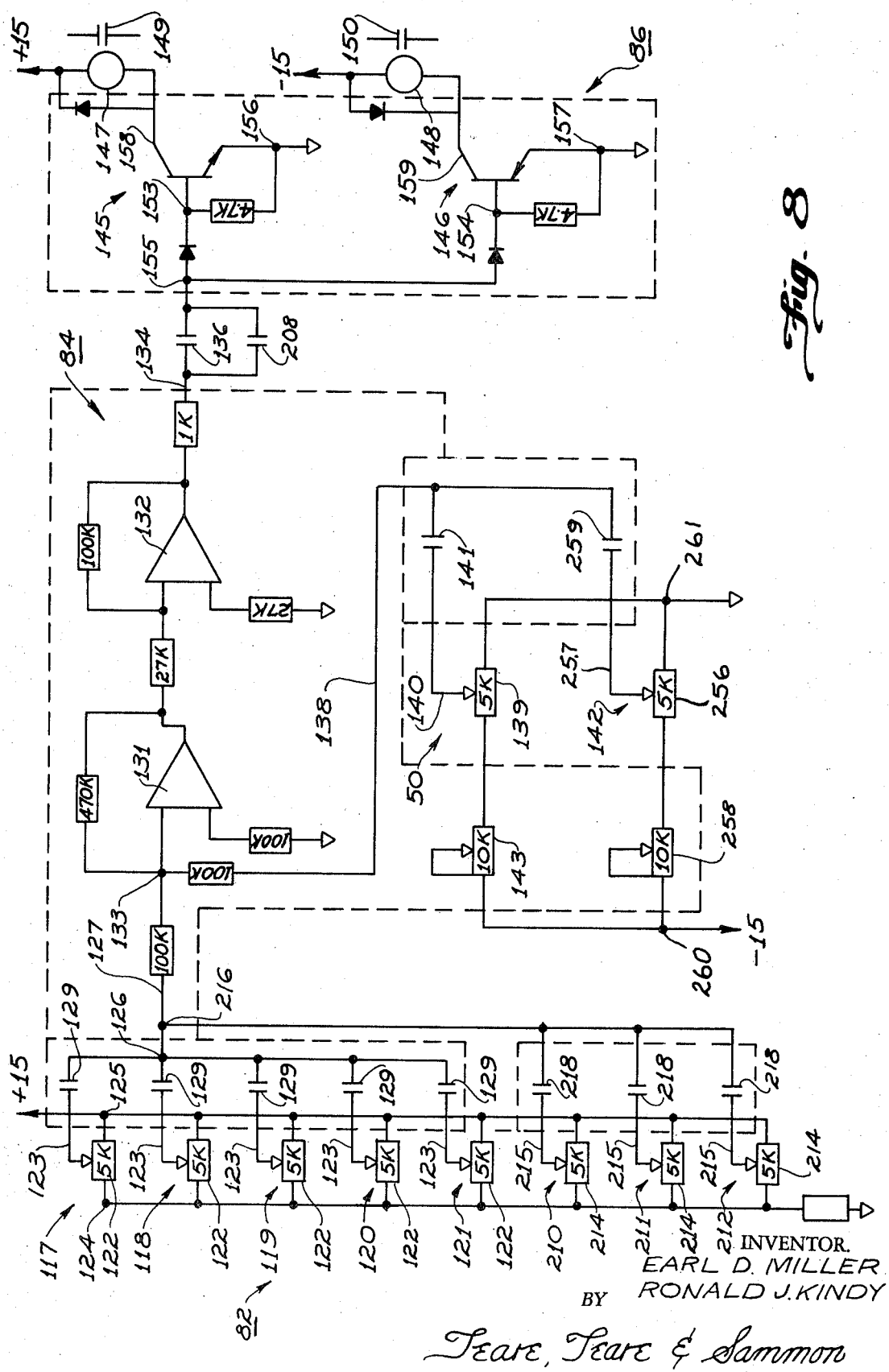

POSITIONING DEVICE

BACKGROUND OF THE INVENTION

The present invention relates to positioning devices, and more particularly, to those devices for automatically positioning a machine or various working components thereof.

Heretofore, numerous devices have been employed to control the movement of a machine or a component thereof from one work position to another. In one instance, rotary cam switches have been employed which actuate electrical contacts which have started and stopped a drive mechanism. These devices have not been entirely satisfactory in that any desired change in the setting of one of the switch actuators resulted in a corresponding change in other of the actuators. In those cases where manual operations are performed in conjunction with rotary cam-type switches, a satisfactory degree of consistency is still difficult to obtain unless the operator is highly skilled. Although rotary cam-type switches have resulted in a substantial improvement in the consistency of machine operations, they still have been found to be subject to maladjustment. Still further, the adjustment of rotary cam switches have been found to be extremely cumbersome and tedious and often requiring frequent adjustment before a final setting can be attained. In addition, the setting of rotary cam switches requires extensive set up time for each job resulting in high operational and maintenance costs. More recently, switching devices have been utilized for positioning and actuating the various components of a machine. These latter devices employ pivotable cam members which actuate electrical switches which may start and stop a drive mechanism and are described in U.S. patent application Ser. No. 25,356, filed Apr. 3, 1970. Although these devices can be more quickly and easily pre-set and also function with a higher degree of accuracy than the former rotary cam switches and essentially eliminate the need for adjustment after the initial setting, they have not been found to be entirely satisfactory for certain operations. In addition, these latter devices, although considerably less expensive than the rotary cam switches, are still not considered sufficiently economical for certain types of operations.

SUMMARY OF THE INVENTION

The present invention contemplates providing an improved system for use with a drive mechanism to selectively position one or more work members, such as a tool carriage, a supply tray or similar machine components, to enable the performance of operations of a machine, such as a tire building machine or any machine requiring the movement of the various components thereof for performance of operations at various positions. Briefly, the system comprises probe means adapted for operable engagement with at least one work member for sensing the position thereof. A signal means is operably connected to the probe means being adapted to produce an output signal varying in relation to the position of the work member. A selector means is provided being adapted to be pre-set to a desired position for the work member and adapted to produce an output signal corresponding to the desired position. A position indicating means is operably connected to the selector means and to the signal means to receive the output signals therefrom and produce an output signal related to the existing position of the work member with respect to the desired position thereof. A signal analyzing means is operably connected to the position indicating means being adapted to receive and analyze the output signal therefrom to control the operation of said drive mechanism in response thereto. Further, the probe means includes a housing and a carriage means mounted for reciprocating movement therein. An elongated probe element is attached at one end to the carriage having its opposite end extending outwardly therefrom for operable engagement with the work member. The carriage means includes a carriage member mounted for sliding movement within the housing and a resilient means coacting therewith to urge the carriage member toward one side of the housing. The signal means includes a potentiometer means adapted to produce a voltage signal varying in relation to the position of the work member. The selector means includes command means operably connected thereto for initiating movement of the work member. Further, the selector means includes a plurality of adjustable resistor members electrically connected to produce a voltage signal corresponding to the desired position for the work member. The position indicating means includes a comparison circuit adapted to compare the output signal of the selector means and the output signal of the signal means and produce a voltage signal relating thereto. The signal analyzing means includes a polarity responsive means adapted to sense the polarity of the output signal of the position indicating means for controlling the movement of the drive mechanism.

As can be seen, by the aforementioned arrangement, there is provided an extremely economical and highly efficient system for use with a drive mechanism to move a work member from an existing position to a desired position. More particularly, the aforementioned arrangement provides for extremely rapid setting of multiple positions and enables minor adjustments to be made during the performance of the operations. Further, such an arrangement is extremely simple in construction as compared to former systems and/or devices having considerably fewer moveable parts which are subject to wear. In addition, the system provides for automatic compensation for any wear of such parts to achieve a more uniformly precise positioning of machine components.

BRIEF DESCRIPTION OF THE DRAWINGS

FIG. 8 is a diagrammatic illustration of another portion of a typical electrical circuit which can be utilized in carrying out the present invention;

FIG. 9 is another portion of a typical electrical circuit which can be utilized in carrying out the present invention; and FIG. 10 is still another portion of a typical electrical circuit which can be utilized in carrying out the present invention.

DESCRIPTION OF THE PREFERRED EMBODIMENT

Figure 1:
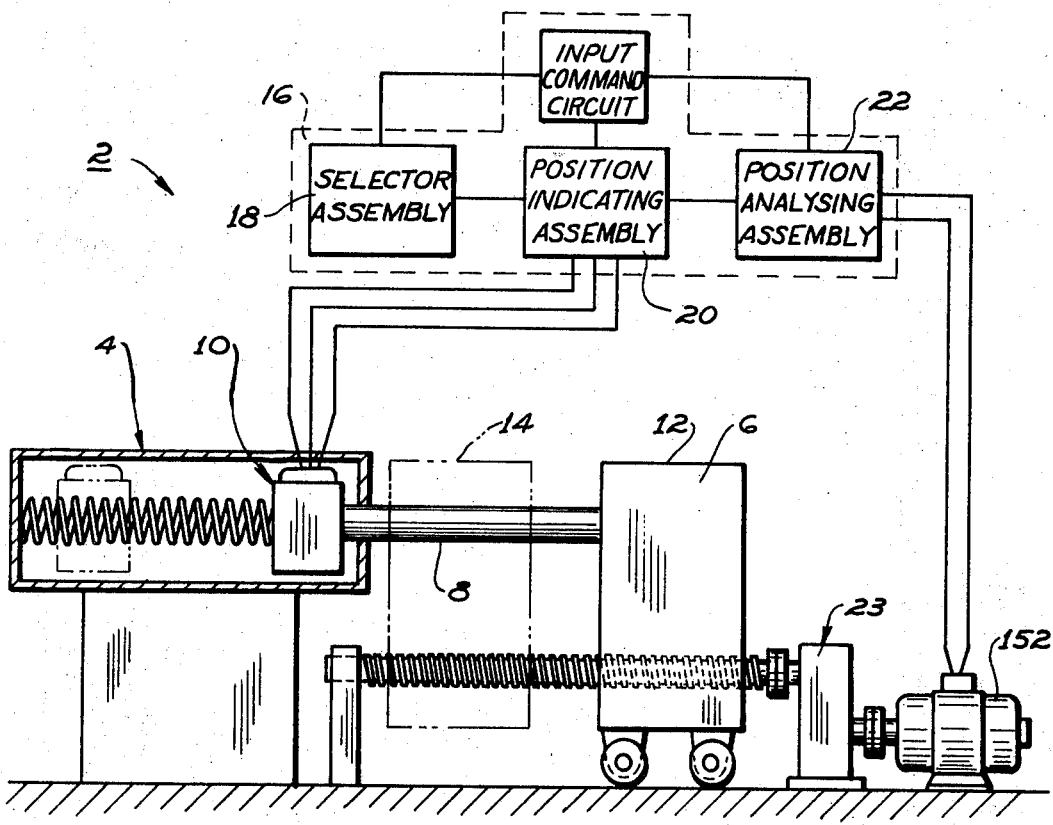
FIG. 1 is a diagrammatic representation of the positioning system of the present invention.

The positioning system of the present invention is diagrammatically illustrated in FIG. 1, generally at 2, as including a position sensing apparatus 4 adapted for sensing the position of a work member, as at 6. A signalling mechanism 10 is provided including a probe arm 8 adapted to engage and be moved by the work member 6 between an existing position, such as indicated by the solid lines 12, to a desired position, such as indicated by the phantom lines 14. The signalling mechanism 10 is arranged to produce an output signal which varies in relation to the existing position of the work member 6 as it moves from one position to another, as will be more fully described hereinafter. A control apparatus 16 is provided including a selector assembly 18 for selecting the desired position and/or positions of the work member. A position indicating assembly 20 is operably connected to the selector assembly 19 and the signalling mechanism 8 of the position sensing apparatus 4 for producing an output signal which corresponds to the existing position of the work member with respect to the desired position thereof. A position analyzing assembly 22 is operably associated with the position indicating assembly 20 being adapted to receive the output signal therefrom, and similarly, produce an output signal to cause actuation of a drive mechanism, such as at 23 to move the work member 6 from the existing position, as at 12, to the desired position, as at 14.

Figure 3:
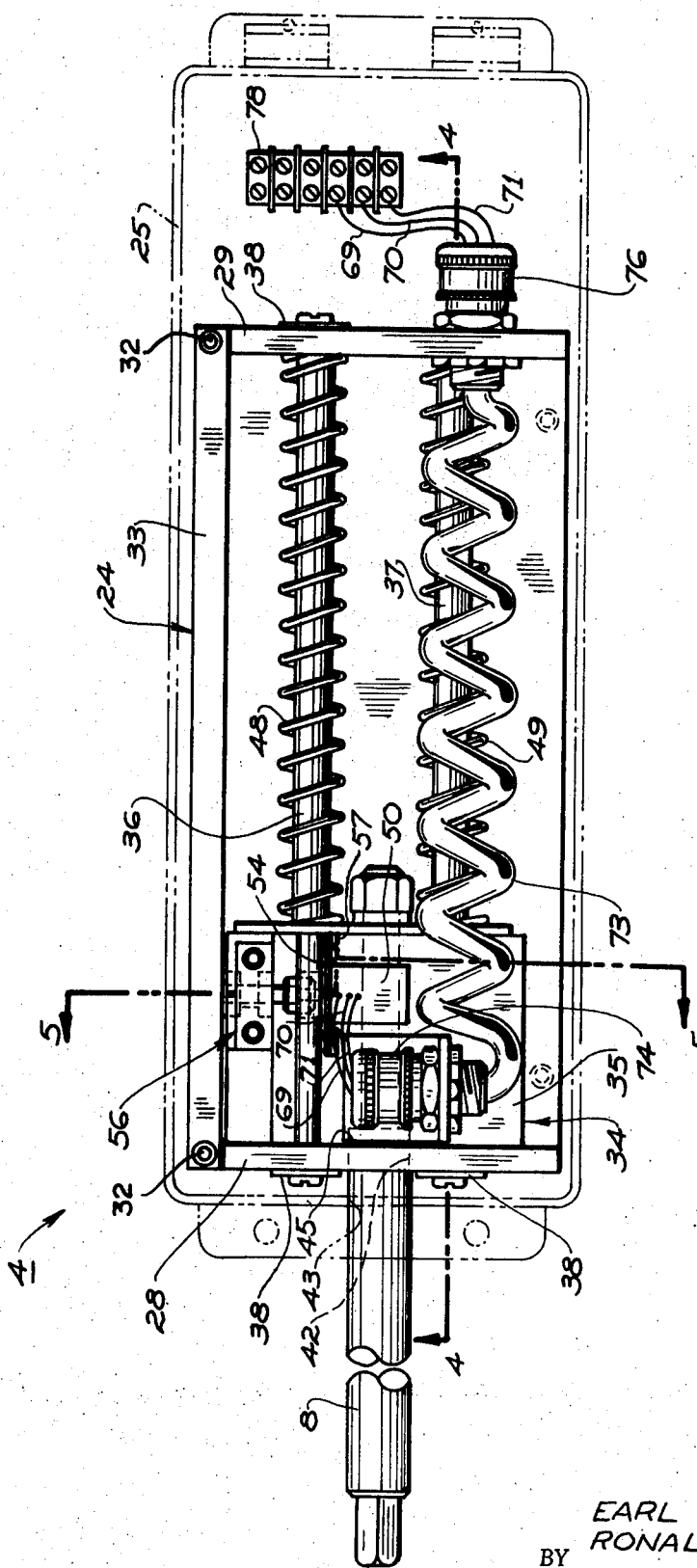
FIG. 3 is a top plan view of the position sensing apparatus of the present invention.
Figure 4:
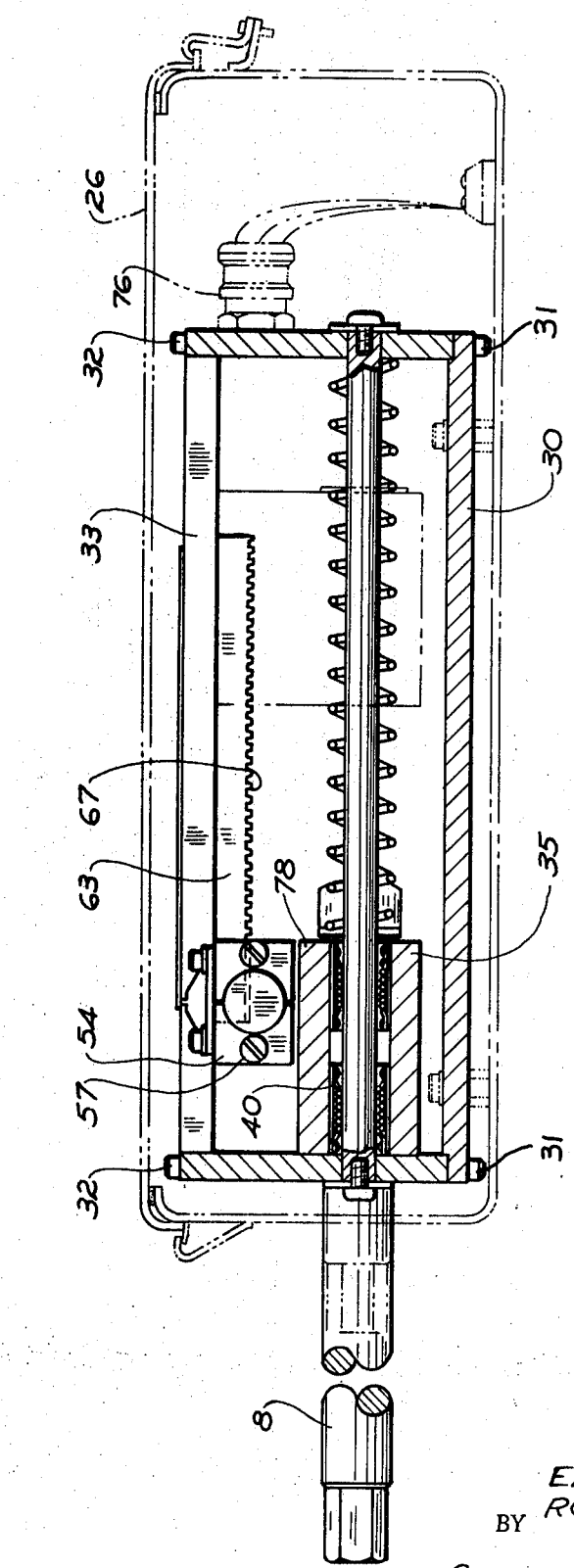
FIG. 4 is a longitudinal section view taken along the lines 4—4 of FIG. 3.

Referring now to FIG. 3, the position sensing apparatus 4 includes a housing 24 which may be mounted within a protective enclosure 25 which may be provided with a removeable lid 26 (FIG. 4). In the form shown, the housing includes opposed front and rear walls 28 and 29, respectively. The walls 29 and 29 extend generally upwardly from and secured to the bottom wall 30, such as by suitable fasteners 31 (FIG. 4). The upper ends of the walls 28 and 29 are rigidly connected, such as by fasteners 32, to an elongated, longitudinally extending bar 33 which is mounted in spaced relation from the bottom wall 30.

In the form shown in FIG. 3, the signalling mechanism 8 comprises a carriage assembly 34 including a carriage 35 mounted for sliding movement along guide rods 36 and 37 to enable movement thereof between the front 28 and rear 29 walls of the housing 24. The guide rods 36 and 37 extend longitudinally of the housing 24 having their opposed ends rigidly secured to the front and rear walls by suitable fasteners, such as lock washers 38. Referring now to FIG. 4, the carriage 35 may be provided with suitable slide bearings, such as at 40, to facilitate sliding movement of the carriage 35 along the guide rods 36 and 37. As shown in FIG. 3, the probe arm 8 comprises a shaft having one end attached to the carriage 35 and the other end extending outwardly from the housing 24 and enclosure 25 through openings 42 and 43, respectively, being adapted for engagement with the work member 6. The shaft 8 may be secured to the carriage member 35 in any suitable manner, and in the form shown, is provided with a reduced diameter adjacent its connected end providing a shoulder 45 adapted for abutting engagement with the front side of the carriage 35. The shoulder 45 may be tightened into abutting engagement by means of a lock nut 46 which may be threadably connected to the shaft 8 adjacent the rear side of the carriage 35.

As shown in FIGS. 3 and 4, the carriage assembly 34 includes resilient members, such as helical springs 48 and 49, which may be disposed circumferentially about the guide rods 36 and 37 being adapted to bias the carriage 35 in a direction toward the front wall 28. As shown, the springs 48 and 49 extend lengthwise along the guide rods 36 and 37 being in engagement at one end with the rear side of the carriage 35 and at the opposite end with the rear wall 29. By this arrangement, when a force is applied to the shaft 8, the carriage 35 will be urged in a direction toward the rear wall 29 against the force of the springs 48 and 49. When the force on the shaft 8 is removed, the springs 48 and 49 will urge the carriage back to its original position adjacent the front wall 28.

Figure 5:
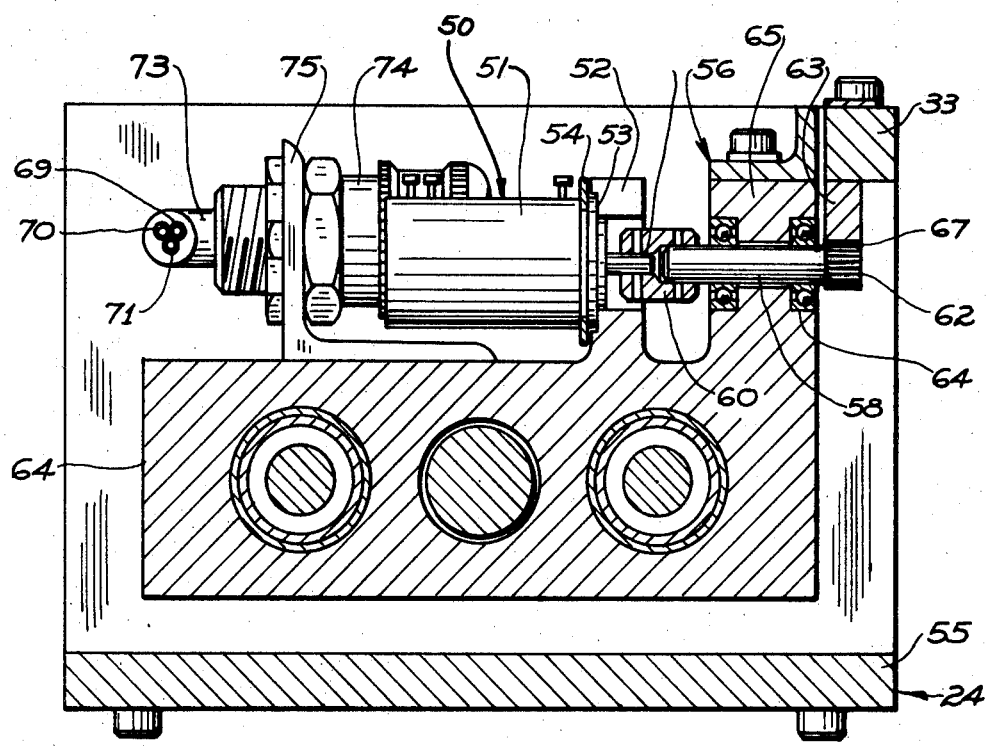
FIG. 5 is a transverse sectional view taken along the lines 5—5 of FIG. 4.
Figure 6:
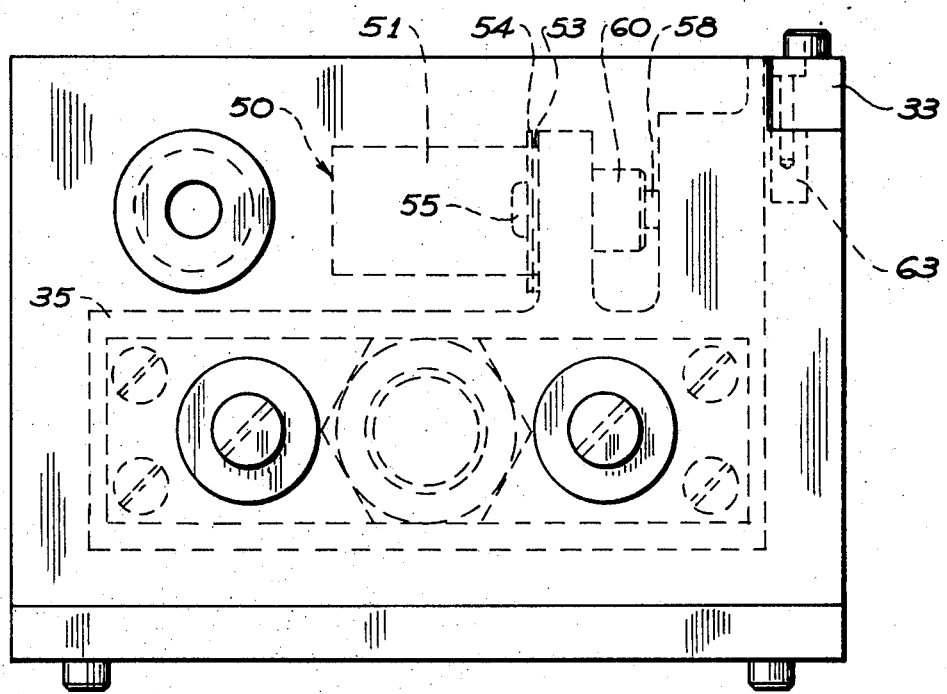
FIG. 6 is an end elevation view of the positioning apparatus of the present invention as seen from the right hand side of FIG. 4 as shown with the cover removed.

Referring now to FIGS. 4, 5 and 6, the signalling mechanism 8 includes a slave potentiometer 50 adapted to produce a voltage signal which varies directly with the movement of the carriage 35. As shown, the potentiometer 50 includes a body 51 which is mounted on the carriage 35 being supported at one end by a generally upright arm 52. The potentiometer body may include an annular flange 53 adapted to be clamped to the arm 52 by a plate 54, such as by suitable fasteners 55. In the form shown, the potentiometer 50 is of the rotating type including a drive shaft 55 which extends outwardly toward one side of the carriage 35.

To impart movement to the potentiometer 50, a drive assembly 56 is provided including a shaft 58 adapted at one end for connection to the shaft 55 of the potentiometer 50, such as by the coupling 60, and at its opposite or drive end being provided with axially extending teeth, as at 62, for driving engagement with a rack-like member 63 mounted adjacent the underside of the bar 33. As shown, the shaft 55 is journaled for rotation within a bearing 64 carried by the carriage 35. The bearing 64 is supported by a wall 65 which extends upwardly on one side of the carriage adjacent the bar 33. The shaft 58 extends outwardly from the wall 65 into the space between the bar 33 and the bottom wall 30 of the housing 34. the rack-like member includes a plurality of laterally-spaced teeth 67 disposed lengthwise thereof, and which extend downwardly from the bar 33 being adapted for intermeshing driving engagement with the teeth 62 of the shaft 58. By this arrangement, as the carriage moves back and forth in the aforesaid manner, the teeth 67 will engage the teeth 62 to cause rotation of the shaft 58, and thus, rotate the potentiometer shaft 55.

In the form shown, the potentiometer 50 includes three leads 69, 70 and 71 adapted for connection to a maximum positive voltage source, such as +15 volts, a maximum negative voltage source, such as −15 volts and ground, respectively. The leads 69, 70 and 71 are carried by a conduit 73 which is connected at one end to a fixture 74 supported by a bracket 75 attached to the carriage 35 and at the other end to a fixture 76 mounted on the rear wall 29. As shown, the conduit 73 is provided in coiled form being adapted to retract and extend as the carriage moves back and forth within the housing 24. The leads 69, 70 and 71 extend outwardly from the fixture 76 and are connected to a terminal block 78 mounted within the enclosure 25 being adapted to connect the leads 69, 70 and 71 to corresponding leads (not shown) from the control apparatus 16.

CONTROL APPARATUS

Figure 7:
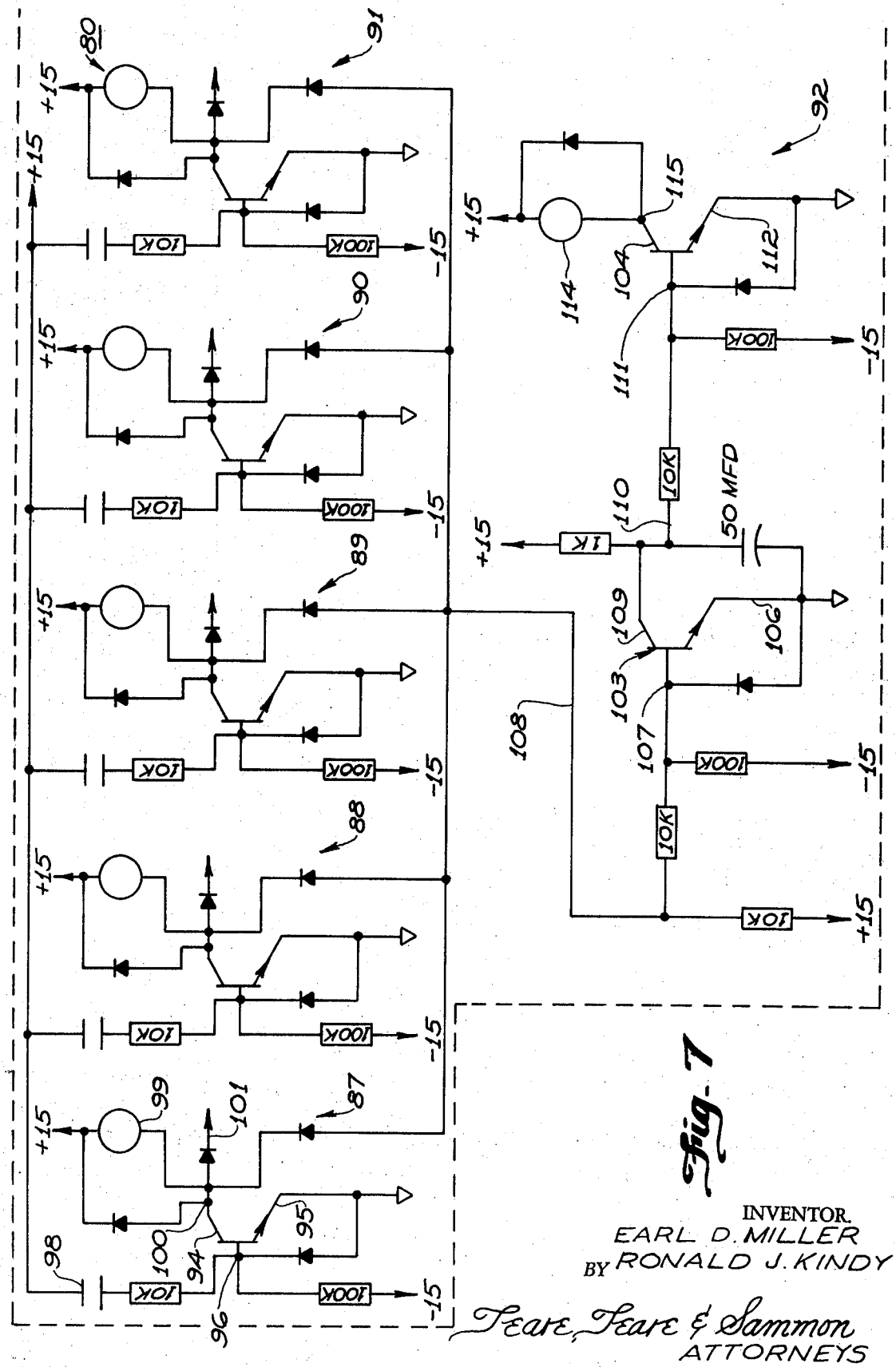
FIG. 7 is a diagrammatic illustration of one portion of a typical electrical circuit which can be utilized in carrying out the present invention.

In general the control apparatus 16 comprises electrical circuitry as shown in FIG. 7 and 8, and includes an input command circuit, indicated generally at 80 in FIG. 7; a selector circuit, indicated generally at 82 in FIG. 8; a position indicating circuit, indicated generally at 84 in FIG. 8; and a signal analyzing circuit, indicated generally at 86 in FIG. 8.

The input command circuit 80 may be provided with a plurality of switching circuits 87 to 92 which are adapted to control the operation of the selector circuit in a manner to be described more fully hereinafter. The switching circuits 87 to 91 are identical in construction, and thus, only one, such as 87, will be described in detail with like elements of the remaining switches 88 to 91, being designated by like numerals. The switching circuit 87 is shown as a conventional transistor switch including a transistor 94 having its emitter terminal 95 connected to ground and its base terminal 96 connected to a negative voltage source, such as −15 volts, so as to reverse bias the transistor 94, and thus "cut-off" the transistor 94 when the system is in the OFF condition. A normally-open relay contact 98 is connected between the base terminal 96 and a positive voltage source, such as +15 volts. A relay coil 99 is connected in series between a collector terminal 100 of the transistor 94 and the positive voltage source being adapted to actuate the relay contact 98 upon erergization thereof. In the form shown, the output terminal 101 of the switching circuit 87 may be connected to a manually operated push button or tape control (not shown) mounted on the control apparatus being adapted for connection to ground whereby upon actuation thereof the relay coil 99 will be energized to close the relay contact 98. By this arrangement, closing of the relay contact 98 will cause a positive pulse to be transmitted to the base terminal 96, and thus, cause the transistor 94 to be "turned-on" to maintain current flow through the relay coil 99 when the operator releases the push button or the tape control moves to another position.

The switching circuit 92 includes transistors 103 and 104 forming a two-stage transistor switch. As shown, the emitter terminal 106 of the transistor 103 is connected to ground while the base terminal 107 is connected to the output terminals 101 of the respective switches 87 to 91 via the conductor 108. The base terminal 107 is shown as being connected to the negative voltage source so that the transistor is in the cut-off condition in the OFF condition of the system. The base terminal 107 is also shown as being connected to the positive voltage source such that upon actuation of any one of the switches 87 to 91, a positive pulse will be applied to the base terminal 107 of the transistor 103. The collector terminal 109 of the transistor 103 is shown connected to the positive voltage source while the output terminal 110 thereof is connected to the base terminal 111 of the transistor 104. The emitter terminal 112 of the transistor 104 is connected to ground while the base terminal 111 is connected to the negative voltage source so that the transistor 104 will be reversed biased and in the cut-off condition in the OFF condition of the system. A control relay 114 is connected between the collector terminal 115 of the transistor 104 and the positive voltage source. By this arrangement, when the transistor 103 is turned-on a positive pulse will be applied via the output terminal 110 to the base terminal 111 to turn-on the transistor 104 and energize the relay coil 114 and thus, enable operation of the signal analyzing circuit in a manner to be described more fully hereinafter.

Referring now to FIG. 8, the selector circuit 82 includes a plurality of selector units 117 to 121 which are adapted to be pre-set for each desired position for the work member 6. As each of the selector units are identical, only one, such as 117 will be described in detail with corresponding elements of the remaining selector units being described by like numerals. In the form shown, the selector unit 117 comprises a variable resistance potentiometer including a resistor element 122 and an adjustable contact arm 123. In a preferred form, the potentiometer 116 may be of the dial-type which may be provided with suitable calibrations to indicate corresponding positions of the work member. As shown, the resistor element 122 is connected on one side to ground, as at 124, and on the other side, as at 125, to the positive voltage source. Each of the contact arms 123 is connected to a common terminal point 126 which in turn is connected to the position indicating circuit 84 via the conductor 127. A normally open relay contact 129 is connected between the contact arm 123 and the common connection 126 to disconnect the respective selector unit from the position indicating circuit 84. Each of the relay contacts 129 for the respective selector units 117 to 121 is operably connected to a respective one of the relay coils 99 of the switching circuit 87 to 91 so that upon energization of the latter the contacts 129 will be closed. By this arrangement, any one or all of the selector units 117 and 121 may be selectively pre-set to a desired position for the work member 6. Then, the corresponding switching circuit, such as 87 to 91, is actuated as previously stated energizing its respective coil to close the corresponding relay contact 129, and thus, connect the desired one of the selector units, such as 117 to 121, to the position indicating circuit 84.

The position indicating circuit 84 is shown as including amplifier units 131 and 132 adapted to receive and amplify the difference signal applied to the input terminal thereof, such as at 133. The amplified signal is transmitted from the position indicating circuit via the conductor 134 to the signal analyzing circuit 86 via the normally open relay contact 136. The relay contact 136 is operably associated with the relay coil 114 of the switching circuit 92 so that upon energization of the latter, the contact 136 will be closed to connect the position indicating circuit to the signal analyzing circuit to enable operation thereof. The input terminal 133 is shown connected to the variable voltage potentiometer 50 of the position sensing apparatus 4 via the conductor 138. As shown, the potentiometer 50 includes a resistor element 139 and moveable contact arm 140. A normally open contact 141 is connected between the contact arm 140 and input terminal 133 to isolate the potentiometer 50 when additional potentiometer units, such as at 142, are provided for a reason which will be more fully described hereinafter. A calibrating potentiometer 143 is connected in series with the potentiometer 50 to enable precise calibration thereof with respect to the position of the work member 6. The relay contact 141 is operably associated with the relay coil 114 whereby upon energization of the latter the relay contact 141 will close, and thus connect the potentiometers 50 and 143 into the position indicating circuit 84. As shown, the potentiometers 50 and 143 are connected between ground and the negative voltage source to thus provide an operating voltage within such limits. By the aforementioned arrangement, the voltage signal from any one of the selector units 117 will be transmitted to the position indicating circuit 84 to establish a reference voltage to be compared to the output voltage of the signaling mechanism 8. The difference voltage between the reference voltage and the voltage of the signaling mechanism 8 is amplified by the amplifiers 131 and 132 and transmitted via the contact 136 to the signal analyzing circuit 86.

The signal analyzing circuit 86 comprises switching circuits 145 and 146 which are electrically connected to the control relays 147 and 148. Normally open contacts 149 and 150 are operably associated with the relay coils 147 and 148, respectively, being adapted to start and stop a drive member, such as an electric motor 152 or the like. As shown, the base terminals 153 and 154 of the transistors 145 and 146, respectively, are commonly connected, such as at 155. The emitter terminals 156 and 157 of the transistors 145 and 146 are connected to ground, whereas the collector terminal 158 of the transistor 145 is connected to the positive voltage source via the relay coil 147 and the collector terminal 159 of the transistor 146 is connected to the negative voltage source via the relay coil 148. In addition, the emitter circuit of the transistor 145 is reverse biased with respect to the emitter circuit of the transistor 146. By this arrangement, a positive voltage signal from the position indicating circuit 84 applied at the connection 155 will forward bias the transistor 145 and further reverse bias the transistor 146. When this occurs, the transistor 145 will be turned on, whereas, the transistor 146 will remain cut-off. When the transistor 145 is turn-on, the relay coil 147 will be energized to close the contact 149 to start the motor 152 for moving the work member 6 from its existing position on one side of the desired position toward the desired position. On the other hand, when a negative voltage signal is applied at the connection 155 the transistor 145 will be cut-off and the transistor 146 will be turned-on causing current to flow through the relay coil 148 to close the contact 150, and thus, drive the motor 152 in the opposite direction to move the work member from the other side of the desired position toward the desired position.

Figure 2:
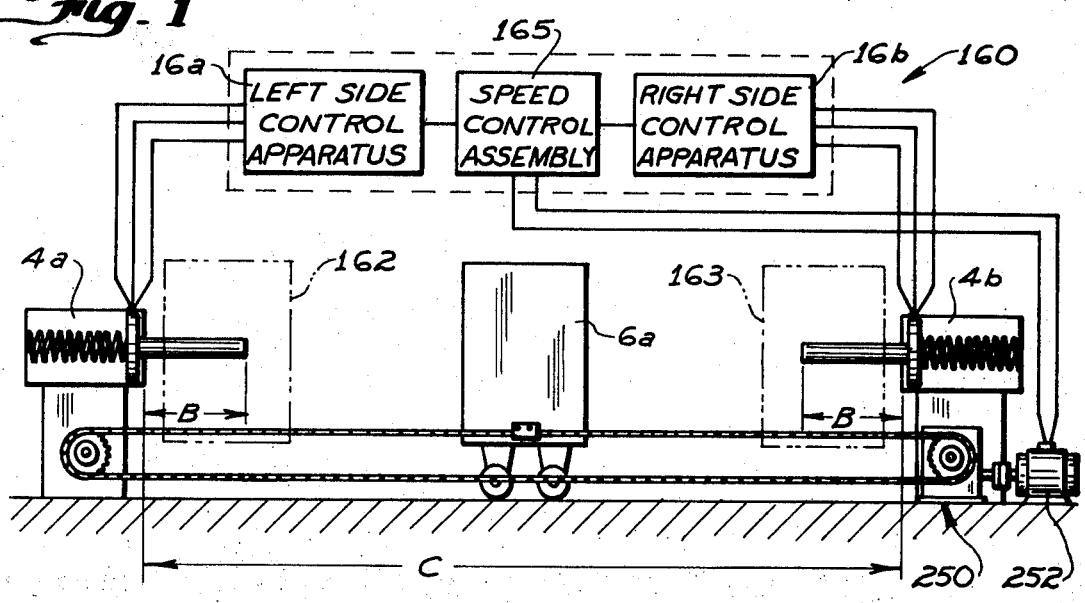
FIG. 2 is a diagrammatic representation of another form of the positioning system of the present invention.

Referring now to FIG. 2, there is schematically illustrated, generally at 160, another form of the present invention wherein a plurality of position sensing devices 4a and 4b are utilized to control the movement of a work member 6a between spaced positions 162 and 163 and precisely position the work member 6a within a range, such as indicated by the distances B, at the opposed termini of the path of travel of the work member 6a, such as indicated by the distance C. As shown, a left side control apparatus 16a is provided to control the operation of the position sensing device 4a on the left side when viewing FIG. 2, whereas, a control apparatus 16b is provided for controlling the position sensing apparatus 4b on the right side of FIG. 2. A speed control assembly 165 is operably connected to the left and right said control apparatuses for increasing the rate of travel of the work member 6a from the right hand side when controlled by the position sensing device 4b to the left hand side for control by the position sensing device 4a, and vice versa. It is to be understood that more than two position sensing devices may be utilized, but only two have been shown for purposes of illustration.

Figures 9, 10:
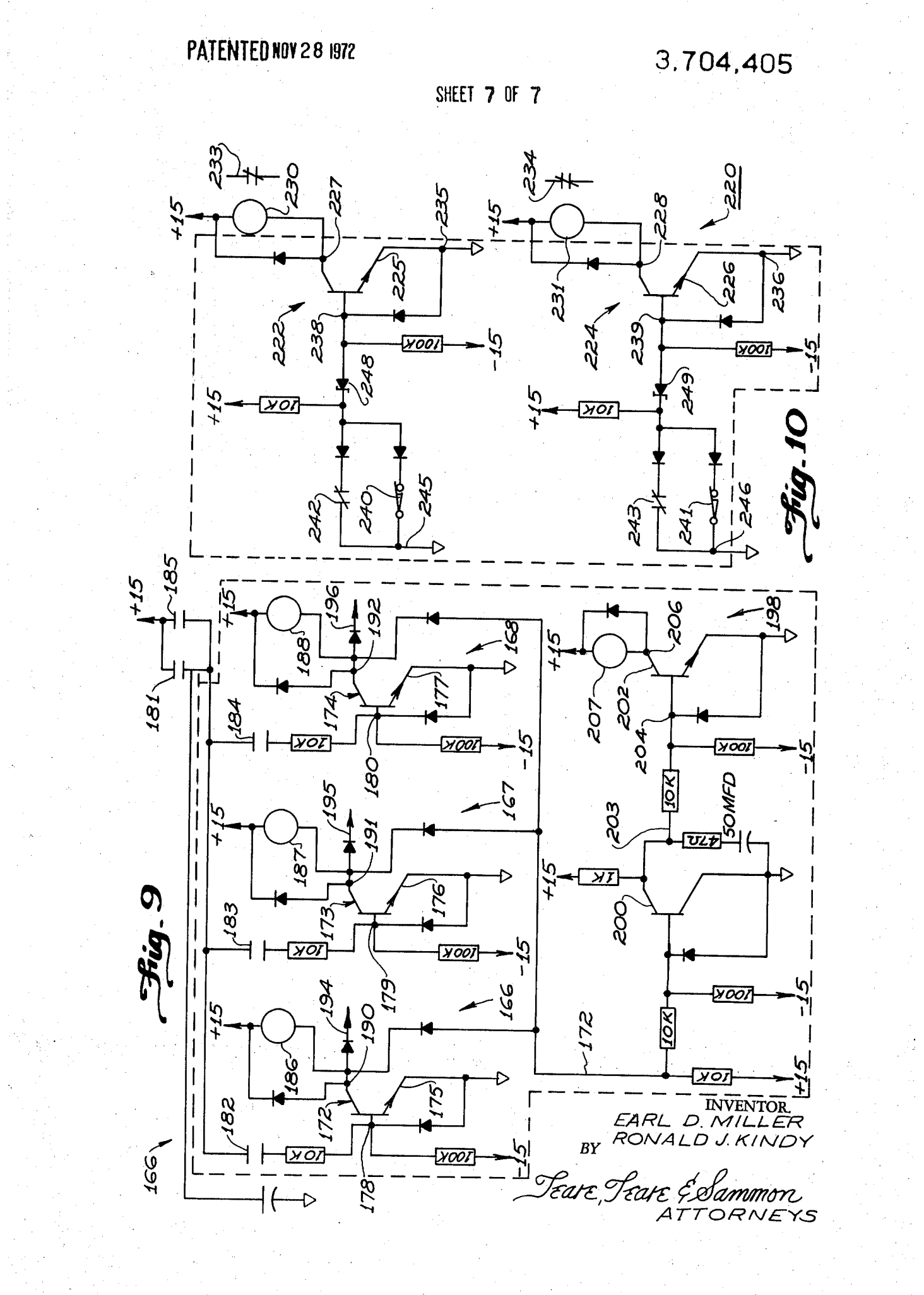

Referring now again to FIG. 7, for purposes of description, the left side control apparatus 16a is the same as described with respect to the control apparatus 16 of FIG. 1. Referring now to FIG. 9, the right hand side control apparatus includes an input command circuit 166 including switching circuits 166, 167 and 168. As stated with respect to the input command circuit 80, the input command circuit 166 may include any number of switching circuits, and thus, three are shown for purposes of illustration. As shown, the circuits 166, 167 and 168 are identical in construction to the switching circuits 87 to 91 of the input command circuit 80 and are shown as including transistors 172, 173 and 174, respectively. Each of the transistors has its respective emitter terminal 175, 176 and 177 connected to ground, whereas, the base terminals 178, 179 and 180 are connected to the negative voltage source. The base terminals 178, 179 and 180 are also connected via relay contacts 182, 183 and 184, respectively, to the positive voltage source. The input command circuits 80 and 84 may be connected to the positive voltage source via either of the normally open contacts 181 and 185 which are operably connected to and adapted to be closed upon energization of the relay coil 147 and 148, respectively. Relay coils 186, 187 and 188 are connected between the collector terminals 190, 191 and 192 of the transistors 172, 173 and 174, respectively and the positive voltage source. The output terminals 194, 195 and 196 may be connected to push buttons or a tape control to selectively energize a respective one of the relay coils 186, 187 and 188, and thus, close one of the associated contacts 182, 183 and 184. The switching circuit 198 is provided which functions identically to the switching circuit 92 of the input command circuit 80. As shown, the switching circuit 198 includes transistors 200 and 202. The base terminals of the transistor 200 is connected to the respective output terminals of the switching circuits 166, 167 and 168 via the conductor 172. The output terminal 203 of the transistor 200 is connected to the base terminal 204 of the transistor 202 to turn-on the transistor 202 when the transistor 200 is turned-on. The relay coil 205 is electrically connected to the collector terminal 206 of the transistor 202, and thus, is energized when the transistor 202 is turned-on. The control relay is operably associated with a relay contact 208 which is connected in parallel with the relay contact 136. By this arrangement, the energization of either the relay coil 114 of the left side control apparatus or the relay coil 205 of the right side control apparatus will close the contacts 136 and 208, respectively, to enable operation of the signaling analyzing circuit.

When left and right side position sensing apparatuses are utilized, as shown in FIG. 2, additional selector units are provided depending upon the number of positions to be controlled by the right hand side control. In the particular arrangement shown, selector units 210, 211 and 212 are provided for operation in conjunction with the switching circuits 166, 167 and 168, respectively. Again, the selector units 210, 211 and 212 are identical in construction and function to the selector units 117 to 121. As shown, each of the selector units 210, 211 and 212 includes a resistor element 214 and a moveable contact arm 215. The resistor element is connected on one side to ground and on the opposite side to the positive voltage source. Each of the adjustable contact arms 215 are connected to the position indicating circuit 84, as at 216, via the relay contacts 218 which are operably associated with the respective relay coils 186, 187 and 188 of the input command circuit 166 so that when a position on the right side adjacent the position sensing apparatus 4b is desired, a respective one of the switching units 166, 167 or 168 will be selectively activated, as aforesaid, energizing the associated relay coil 186, 187 or 188, respectively, which will close the associated relay contact 218.

Referring again to FIG. 8, the position sensing apparatus 4b includes a slave potentiometer 142 which is identical in construction and function to the slave potentiometer 50. As shown, the potentiometer 142 includes a resistor element 256 and adjustable contact arm 257. The contact arm 257 is connected to the position indicating circuit 84 via the normally-open relay contact 259 which is adapted to isolate the potentiometer 142 therefrom when the potentiometer 50 is in operation. A calibrating potentiometer 258 is connected in series with the slave potentiometer 142 between the negative voltage source, as at 260, and ground, as at 261. In the form shown, the relay contacts 141 and 259 are operatively associated with the relay coils 114 and 205 such that upon actuation of any one of the switching circuits 87 to 91 the contact 114 will close for operation of the potentiometer 50 of the left side position sensing apparatus 4a, and similarly, upon actuation of any one of the switching circuits 166 to 168 the contact 258 will close for operation of the potentiometer 142 of the right side position sensing apparatus 4b.

As the distance to be traveled between the position sensing apparatuses 4a and 4b is greater their collector terminals 227 and 228 to relay coils 230 and corresponding transverse dimensions of the work member, a speed control circuit, shown generally at 220, is provided which immediately increases the rate of travel of the work member from a position, such as at 162, under the control of one of the position sensing apparatuses, such as 4a, and maintains such rapid rate until contact is made with the probe arm of the other position sensing apparatus, such as 4b, and then reduces the rate of travel until a desired position is reached, such as at 163.

The speed control circuit 220 includes a pair of switching circuits 222 and 224 including transistors 225 and 226 having 230 and 231, respectively. Normally-closed relay contacts 233 and 234 are provided being adapted to be operated by the relay coils 230 and 231, respectively. The emitter terminals 235 and 236 of the transistors 225 and 226, respectively, are connected to ground and the base terminals 238 and 239 thereof are connected to the negative voltage source to cut-off the transistors 225 and 226 to prevent current flow through the relay coils 230 and 231. Limit switches 240 and 241 are provided which are adapted to be actuated to the open position by the work mechanism when the latter engages the probe arm of the position sensing apparatuses 4a and 4b, respectively. Normally-closed relay contacts 242 and 243 are connected in parallel with the limit switches 240 and 241, respectively, being connected on one side to ground, as at 245 and 246, and connected on the opposite sides to the base terminals 238 and 239 via the zener diodes 248 and 249, respectively. Referring particularly to the switching circuit 222, the zener diodes 248 is in a non-conductive state when either the relay contact 242 or limit switch 240 are in a closed condition. As shown, the zener diode 248 is connected between the positive voltage source and the negative voltage source so that when both the relay contact 242 and the limit switch 240 are open simultaneously, the voltage across the zener diode 248 will be increased sufficiently to cause current conduction therethrough, and thus, apply a positive pulse to the base terminal 238 and thus, turn-on the transistor 225. When this occurs, the relay coil 230 will be energized opening the contact 233. Similarly, opening of the relay contact 243 and limit switch 241 associated with the switching circuit 224 will cause energization of the relay coil 231 to open the relay contact 234.

Referring now again to FIG. 2, any suitable drive mechanism, as at 250, may be provided to impart movement to the work member 6a, and as shown, an electric motor 252 may be provided which may be of the reversible, two-speed type having a high and low speed. The relay contacts 242 and 243 are operably associated with the relay coils 114 and 205 being adapted to be opened upon energization of the latter. The relay contacts 233 and 234 may be operably connected within the motor control (not shown) of the electric motor 252 being adapted to operate the electric motor 252 at high speed upon opening thereof. Therefore, as the limit switch 240 will be opened when the work member 6a is under the control of one of the position sensing apparatuses 4b, actuation of any one of the switching circuits 87 to 91 to move the work member 6a from such position to a position controlled by the position sensing apparatus 4a will cause energization of the relay coil 114 and open the relay contact 242, and thus, energize the relay coil 230 to open the relay contact 233 to run the motor 252 at high speed. As stated, when the work member 6a moves from the right side to the left side, when viewing FIG. 2, out of engagement with the probe arm of the position sensing apparatus 4b the limit switch 241 will open while the limit switch 240 remains open. Accordingly, when the work member 6a contacts the probe arm of the position sensing apparatus 4a the limit switch 240 will be closed deenergizing the coil 230 to close the contact 233 and cause the motor 252 to run at low speed. When in this condition, the selection of a right side position and actuation of any one of the switches 166, 167 and 168 will energize the coil 205. When this occurs, the contact 243 will open, and thus, energize the coil 231 to open the contact 234 and move the work member 6a at high speed away from the position sensing apparatus 4a toward the position sensing apparatus 4b.

We claim:

1. A system for use with a drive mechanism to position one or more work members comprising,
    probe means for operable engagement with a work member for monitoring its position,
    selector means for selecting a desired position for said work member,
    said selector means including a plurality of selectively adjustable selector units each being adapted to produce a range of output signals related to a range of desired positions for said work member,
    signal means operably connected to said probe means being adapted to produce an output signal related to the position of said work member,
    position sensing means operably connected to said selector means and said signal means for receiving the output signals of said signal means and said selector unit for producing an output signal related to the relative position of said work member with respect to the desired position thereof,
    selectively actuatable command means operably connected to said selector means for selectively connecting selective ones of said selector units to said position indicating means, and
    signal analyzing means for receiving and analyzing the output signal of said position sensing means to actuate said work mechanism and move said work member to the preselected position as established by the selective one of said selector units connected to said position sensing means by said command means.

2. A system in accordance with claim 1, wherein said probe means includes a housing,
    a carriage means mounted for reciprocating movement within said housing, and
    an elongated probe element attached at one end to said carriage means and having its opposite end extending outwardly from said housing for operable engagement with said work member.

3. A system in accordance with claim 2, wherein said carriage means includes a carriage member mounted for movement back and forth within said housing, and
    said probe element comprises a drive shaft coupled to said carriage for imparting reciprocating movement thereto.

4. A system in accordance with claim 2, wherein said carriage means includes a carriage member mounted for movement back and forth within said housing, and
    said probe element comprises a shaft member connected at one end to said carriage being adapted to impart movement thereto.

5. A system in accordance with claim 1, wherein said signal means includes potentiometer means adapted to produce a variable voltage signal.

6. A system in accordance with claim 3, wherein said carriage means includes resilient means coacting between said housing and said carriage member to urge said carriage member toward one side of said housing.

7. A system in accordance with claim 1, wherein said selector units comprise potentiometer assemblies connected in electrically parallel relationship each being adapted to produce a variable voltage signal.

8. A system in accordance with claim 1, wherein said position sensing means comprises a comparison circuit means,
    said selector means includes adjustable resistance means adapted to produce a variable voltage output signal, and
    said position sensing means is operably connected to said signal means being adapted to compare the output signal of said selector means with the output signal of said signal means.

9. A system in accordance with claim 1, wherein said signal analyzing means includes polarity responsive means adapted to actuate said drive mechanism and move said work member in one or the opposite direction in response to a positive or negative signal, respectively.

10. A system in accordance with claim 1, including speed control means for controlling the rate of movement of one or more work members.

11. A system in accordance with claim 1, wherein said probe means including a plurality of spaced, probe members operably associated with at least one work member,
    one of said probe members being adapted to control movement of said work member at the terminus of travel of said work member in one direction, and
    another of said probe members being adapted to control the movement of said work member adjacent the terminus of travel of said work member in another direction.

12. A system in accordance with claim 1, wherein said probe means includes a plurality of probe members each being adapted for operable engagement with at least one work member.

13. A system in accordance with claim 1, including a support member,
    said probe means carried by said support member,
    said probe means including an elongated probe member mounted for movement relative to said support member, and
    said signal means includes a potentiometer carried by said probe member and operably connected to said support member to produce an output signal varying in relation to the position of said probe member with respect to said support member.

14. A system in accordance with claim 1, wherein said command means comprises a plurality of switching assemblies each operably connected to a respective one of said selector units for selectively connecting each one of said selector units to said position sensing means.

15. A device for indicating the position of a work member comprising
    a support member, probe means carried by said support member being adapted to sense the position of said work member, signal means operably associated with said probe means for producing an output signal varying in relation to the position of said work member, said probe means including a probe member adapted at one end for operable engagement with said work member and at its other end for coacting engagement with said signal means to produce said output signal, said support member comprises a housing, said probe means includes a reciprocating member mounted for movement back and forth within said housing, and said signal means includes a potentiometer carried by said reciprocating member and operably connected to said housing to produce a variable voltage output signal varying in relation to the position of said carriage within said housing.

16. A device for indicating the position of a work member comprising, a support member, probe means carried by said support member being adapted to sense the position of said work member, signal means operably associated with said probe means for producing an output signal varying in relation to the position of said work member, said probe means including a probe member adapted at one end for operable engagement with said work member and at its other end for coacting engagement with said signal means to produce an output signal, said probe means including a movable member operably connected to said probe member for movement relative to said support member, and said signal means including a potentiometer supported by said support member and operably connected to said movable member to produce a variable voltage output signal varying in relation to the position of said movable member relative to said support member.

17. A device in accordance with claim 16, including a coupling means mounted on said movable member being operably connected between said movable member and said potentiometer for actuating said potentiometer to produce a variable voltage output.

18. A device in accordance with claim 16, wherein said support member comprises a housing, said probe means including a carriage mounted for movement back and forth in said housing, and said probe means including an elongated probe member attached at one end to said carriage and at its opposite end projecting outwardly from said housing for operable engagement with said work member being adapted to impart movement to said carriage upon movement of said work member for varying the output signal of said signal means in relation to the position of said carriage within said housing.

19. A device in accordance with claim 16, wherein said probe means includes a carriage mounted for movement with respect to said support member, and said probe member comprising a shaft coupled to said carriage for imparting movement thereto.

20. A device in accordance with claim 16, wherein said signal means comprising a rotatable potentiometer adapted to produce a variable voltage output signal varying in relation to the position of said work member.

* * * * *